United States Patent
Xu

(10) Patent No.: US 9,201,283 B2
(45) Date of Patent: Dec. 1, 2015

(54) FLAT PANEL ELECTRONIC APPARATUS AND DISPLAY PANEL THEREOF

(71) Applicant: NVIDIA Corporation, Santa Clara, CA (US)

(72) Inventor: Shuang Xu, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 218 days.

(21) Appl. No.: 14/019,471

(22) Filed: Sep. 5, 2013

(65) Prior Publication Data

US 2014/0218787 A1  Aug. 7, 2014

(30) Foreign Application Priority Data

Feb. 5, 2013  (CN) .......................... 2013 1 0045988

(51) Int. Cl.
| | |
|---|---|
| *G02F 1/03* | (2006.01) |
| *G02F 1/07* | (2006.01) |
| *G02B 26/00* | (2006.01) |
| *G02F 1/167* | (2006.01) |
| *G02F 1/1335* | (2006.01) |

(52) U.S. Cl.
CPC .......... *G02F 1/167* (2013.01); *G02F 1/133603* (2013.01)

(58) Field of Classification Search
USPC ......... 359/237, 242, 245, 247, 251–253, 265, 359/267, 273, 277–279, 290–292, 296, 298, 359/315, 317, 318, 321–323; 345/107, 108; 362/559, 561, 600, 615, 623
See application file for complete search history.

(56) References Cited

U.S. PATENT DOCUMENTS

| | | | |
|---|---|---|---|
| 2006/0170667 | A1 | 8/2006 | Zhou et al. |
| 2006/0232547 | A1 | 10/2006 | Johnson et al. |
| 2011/0057870 | A1 | 3/2011 | Miyashita |
| 2011/0273760 | A1 | 11/2011 | Hsieh et al. |

(Continued)

FOREIGN PATENT DOCUMENTS

| | | |
|---|---|---|
| JP | 2007530984 A | 11/2007 |
| JP | 2011059204 A | 3/2011 |

(Continued)

OTHER PUBLICATIONS

Office Action from Taiwan Patent Application No. 102140844, dated Sep. 3, 2015.

*Primary Examiner* — Stephone B Allen
*Assistant Examiner* — Brandi Thomas
(74) *Attorney, Agent, or Firm* — Zilka-Kotab, PC

(57) ABSTRACT

A display panel is provided that includes a plurality of pixel units, each having a first surface and a second surface opposite to the first surface, and comprising an electrophoretic gel part with a shape tapered in a direction from the first surface to the second surface, wherein a top surface of the electrophoretic gel part forms the first surface and electrophoretic particles are provided in the electrophoretic gel part; a light guiding part with a shape tapered in a direction from the second surface to the first surface, wherein the light guiding part and the electrophoretic glue part match in shape and abut with each other, and a bottom surface of the light guiding part forms at least a portion of the second surface; and a light-emitting device provided on the bottom surface of the light guiding part and operable to emit light toward the first surface.

20 Claims, 3 Drawing Sheets

(56) References Cited

U.S. PATENT DOCUMENTS

2013/0162694 A1* 6/2013 Suzuki et al. .................. 345/690
2013/0314763 A1* 11/2013 Wang ............................ 359/296

FOREIGN PATENT DOCUMENTS

| TW | 201246154 A | 11/2012 |
| TW | 201303462 A | 1/2013 |

* cited by examiner

FLAT PANEL ELECTRONIC APPARATUS AND DISPLAY PANEL THEREOF

CROSS-REFERENCE TO RELATED APPLICATIONS

This application claims priority to Chinese Patent Application No. 201310045988.9, filed on Feb. 5, 2013, which is hereby incorporated by reference in its entirety.

FIELD OF INVENTION

The present invention relates generally to electronic devices and, in particular, to a flat panel electronic apparatus and a display panel thereof.

BACKGROUND

The display panels of current flat panel electronic apparatuses, e.g., mobile phones, tablets, Kindle e-books etc., are divided into two kinds according to the basic display principle thereof.

The first kind of display panel is a display panel using electronic ink (E-ink) technology, e.g., a display panel of a Kindle e-book. This kind of display panel comprises a plurality of pixel units formed of electrophoretic gel in which a plurality of black electronegative electrophoretic particles and a plurality of white electropositive electrophoretics are provided. The positions of the black electronegative electrophoretic particles and the white electropositive electrophoretic particles can be controlled by changing an electric field applied to each of the pixel units, so that patterns are displayed on the display panel. This kind of display panel is very stable with lower power consumption. A display pattern using E-ink technology can last for weeks with no need of any additional power input, and only a little power is needed to change the patterns displayed. Also, this kind of display panel has not any brightness, no that it can be viewed conveniently in the sun. However, the display panel using E-ink technology cannot be viewed in the dark.

The other kind of display panel is an active lighting display panel, e.g. a liquid crystal display (LCD), an active matrix organic light emitting diode (AMOLED) etc. This kind of display panel comprises an active lighting light-emitting device. For example, in the AMOLED, organic light emitting diodes (OLEDs) of each of the pixel units emit light so that patterns are displayed on the display panel. This kind of display panel has vivid display effect but consumes large power and is difficult to be viewed in the sun.

SUMMARY OF THE INVENTION

Accordingly, there is a need for providing a flat panel electronic apparatus and a display panel thereof to address the problem described above.

In one embodiment, a display panel is disclosed. The display panel comprises a plurality of pixel units, with each of the pixel units having a first surface and a second surface opposite to the first surface. Wherein each of the pixel units comprises an electrophoretic gel part with a shape tapered in a direction from the first surface to the second surface, wherein a top surface of the electrophoretic gel part forms the first surface, and electrophoretic particles are provided in the electrophoretic gel part. Each of the pixel units also comprises a light guiding part with a shape tapered in a direction from the second surface to the first surface, wherein the light guiding part and the electrophoretic gel part match in shape and abut with each other, and a bottom surface of the light guiding part forms at least a portion of the second surface. Finally, each of the pixel units comprises a light-emitting device provided on the bottom surface of the light guiding part and operable to emit light toward the first surface. Wherein the shape of the light guiding part and the position of the light-emitting device are provided in such a way that light emitted by the light-emitting device is able to reach and cover the entire first surface.

Preferably, a longitudinal cross-section of the electrophoretic gel part perpendicular to a lateral direction comprises an upside-down right trapezoid portion; and a longitudinal cross-section of the light guiding part perpendicular to the lateral direction comprises a right triangle portion, wherein a hypotenuse of the right triangle portion is collinear with a longer lateral side of the right trapezoid portion, so as to form a border-line between the longitudinal cross-section of the electrophoretic gel part perpendicular to the lateral direction and the longitudinal cross-section of the light guiding part perpendicular to the lateral direction.

Preferably, a border-line between a longitudinal cross-section of the electrophoretic gel part perpendicular to a lateral direction and a longitudinal cross-section of the light guiding part perpendicular to the lateral direction is an arc which protrudes toward the electrophoretic gel part or the light guiding part.

Preferably, a longitudinal cross-section of the electrophoretic gel part perpendicular to a lateral direction comprises an upside-down trapezoid portion or an upside-down triangle portion; and a longitudinal cross-section of the light guiding part perpendicular to the lateral direction comprises two right triangle portions located at two sides of the upside-down trapezoid portion or the upside-down triangle portion respectively, wherein two lateral sides of the upside-down trapezoid portion or two lateral sides of the upside-down triangle portion are collinear with the hypotenuses of the two right trapezoid portions respectively, so as to form a border-line between the longitudinal cross-section of the electrophoretic gel part perpendicular to the lateral direction and the longitudinal cross-section of the light guiding part perpendicular to the lateral direction.

Preferably, the light-emitting device comprises one or more organic light emitting diodes.

Preferably, the electrophoretic particles are black and electronegative.

Preferably, the display panel further comprises a controller which controls the pixel units to switch between an E-ink mode and an active lighting mode, wherein when the pixel units are in the E-ink mode, the controller turns off the light-emitting devices and applies electric fields to the pixel units so that the electrophoretic particles are located at positions corresponding to a pattern to be displayed; when the pixel units are in the active lighting mode, the controller applies electric fields to the pixel units so that the electrophoretic particles are located at the bottom surfaces of the electrophoretic gel parts, and controls the light-emitting devices to emit light corresponding to a pattern to be displayed.

Preferably, the display panel further comprises a switch operating member, wherein the switch operating member is coupled to the controller and sends a signal for selecting the E-ink mode or the active lighting mode to the controller; and the controller controls the pixel units to switch between the E-ink mode and the active lighting mode according to the signal.

Preferably, the display panel further comprises an ambient light sensor, wherein the ambient light sensor is coupled to the controller and sends a signal corresponding to an intensity of ambient light to the controller; the controller controls the pixel units to switch to the E-ink mode when the intensity of ambient light is higher than a predetermined value, and the controller controls the pixel units to switch to the active lighting mode when the intensity of ambient light is lower than or equal to the predetermined value.

Preferably, the material of the light guiding part has such a refractive index that light emitted by the light-emitting device is able to reach and cover the entire first surface.

Preferably, the light guiding part is made of Polymethyl Methacrylate material or Cycio Olefins Polymer material.

In another embodiment a flat panel electronic apparatus is presented. The flat panel electronic apparatus has a display panel. Wherein the display panel comprises a plurality of pixel units, with each of the pixel units having a first surface and a second surface opposite to the first surface. Wherein each of the pixel units comprises an electrophoretic gel part with a shape tapered in a direction from the first surface to the second surface, wherein a top surface of the electrophoretic gel part forms the first surface, and electrophoretic particles are provided in the electrophoretic gel part. Each of the pixel units also comprises a light guiding part with a shape tapered in a direction from the second surface to the first surface, wherein the light guiding part and the electrophoretic gel part match in shape and abut with each other, and a bottom surface of the light guiding part forms at least a portion of the second surface. Finally, the each of the pixel units comprises a light-emitting device provided on the bottom surface of the light guiding part and operable to emit light toward the first surface. Wherein the shape of the light guiding part and the position of the light-emitting device are provided in such a way that light emitted by the light-emitting device is able to reach and cover the entire first surface.

Preferably, a longitudinal cross-section of the electrophoretic gel part perpendicular to a lateral direction comprises an upside-down right trapezoid portion; and a longitudinal cross-section of the light guiding part perpendicular to the lateral direction comprises a right triangle portion, wherein a hypotenuse of the right triangle portion is collinear with a longer lateral side of the right trapezoid portion, so as to form a border-line between the longitudinal cross-section of the electrophoretic gel part perpendicular to the lateral direction and the longitudinal cross-section of the light guiding part perpendicular to the lateral direction.

Preferably, a longitudinal cross-section of the electrophoretic gel part perpendicular to a lateral direction comprises an upside-down trapezoid portion or an upside-down triangle portion; and a longitudinal cross-section of the light guiding part perpendicular to a lateral direction comprises two right triangle portions located at two sides of the upside-down trapezoid portion or the upside-down triangle portion respectively, wherein two lateral sides of the upside-down trapezoid portion or two lateral sides of the upside-down triangle portion are collinear with the hypotenuses of the two right trapezoid portions respectively, so as to form a border-line between the longitudinal cross-section of the electrophoretic gel part perpendicular to the :lateral direction and the longitudinal cross-section of the light guiding part perpendicular to the lateral direction.

Preferably, the electrophoretic particles are black and electronegative.

Preferably, the display panel further comprises a controller which controls the pixel units to switch between an E-ink mode and an active lighting mode, wherein when the pixel units are in the E-ink mode, the controller turns off the light-emitting devices and applies electric fields to the pixel units so that the electrophoretic particles are located at positions corresponding to a pattern to be displayed; when the pixel units are in the active lighting mode, the controller applies electric fields to the pixel units so that the electrophoretic particles are located at the bottom surfaces of the electrophoretic gel parts, and controls the light-emitting devices to emit the light corresponding to a pattern to be displayed.

Preferably, the display panel further comprises a switch operating member, wherein the switch operating member is coupled to the controller and sends a signal for selecting the E-ink mode or the active lighting mode to the controller; and the controller controls the pixel units to switch between the E-ink mode and the active lighting mode according to the signals.

Preferably, the display panel further comprises an ambient light sensor, wherein the ambient light sensor is coupled to the controller and sends a signal corresponding to an intensity of ambient light to the controller; the controller controls the pixel units to switch to the E-ink mode when the intensity of ambient light is higher than a predetermined value, and the controller controls the pixel units to switch to the active lighting mode when the intensity of ambient light is lower than or equal to the predetermined value.

Preferably, the material of the light guiding part has such a refractive index that light emitted by the light-emitting device is able to reach and cover the entire first surface.

Preferably, the light guiding part is made of Polymethyl Methacrylate material or Cycio Olefins Polymer material.

Following are the effectiveness of the present invention:

In the display panel of the present invention, each of the pixel units comprises not only an electrophoretic gel part provided with electrophoretic particles, but also a light guiding part and a light-emitting device provided on the bottom surface of the light guiding part. The top surface of the electrophoretic gel part forms the first surface of the pixel unit and the bottom surface of the light guiding part forms at least a portion of the second surface of the pixel unit. The electrophoretic gel part is tapered along the direction from the first surface to the second surface while the light guiding part is tapered in an opposite direction and matches in shape and abuts with the electrophoretic gel part.

It will be understood that since the electrophoretic gel part has a shape tapered in a direction from the first surface to the second surface, the electrophoretic particles will gather at the reduced bottom of the electrophoretic gel part when the electrophoretic particles are controlled to be located near the second surface of the pixel unit and consequently the emitting path of the light emitted by the light-emitting device will not be blocked. The user can see the color of the electrophoretic particles when the electrophoretic particles are located at the larger top of the electrophoretic gel part. Thus, it is possible to control the display panel to run in the E-ink mode or in the active lighting mode through controlling of the positions of the electrophoretic particles and the states of the light-emitting device.

Therefore, the advantages of both the display panels using the E-ink technology and the display panels using the active lighting technology are combined in the display panel of the present invention which can be adapted to high light environment and low light environment flexibly and the power consumption thereof can be lowered.

Advantages and features of the present invention will be described in detail below in connection with the accompanying drawings.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

In the following discussion, details are presented so as to provide a more thorough understanding of the present invention. However, the present invention may be implemented without one or more of these details as would be apparent to one of ordinary skill in the art. Certain examples are illustrated without elaborate discussion of technical features that would be within the purview of one of ordinary skill in the art so as to avoid confusion with the present invention.

Figure 1:
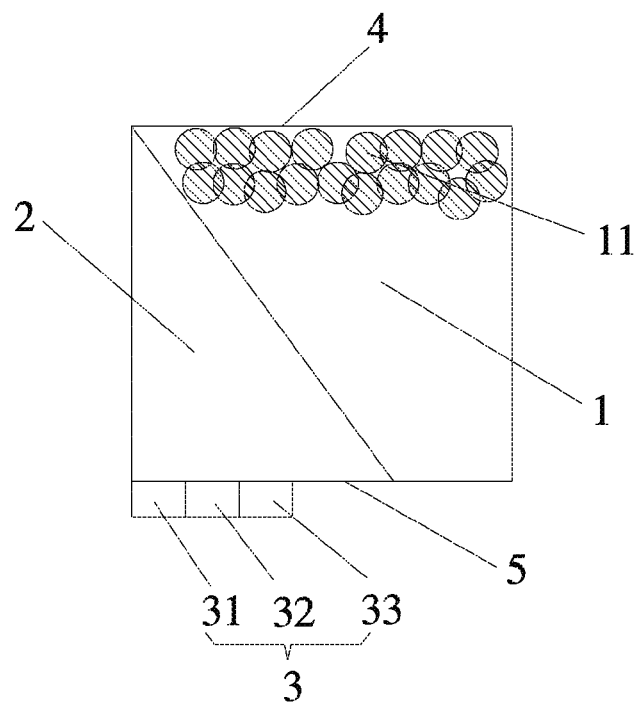
FIG. 1 shows a schematic side view of a pixel unit of the display panel in accordance with the first embodiment of the present invention in the E-ink mode.
Figure 2:
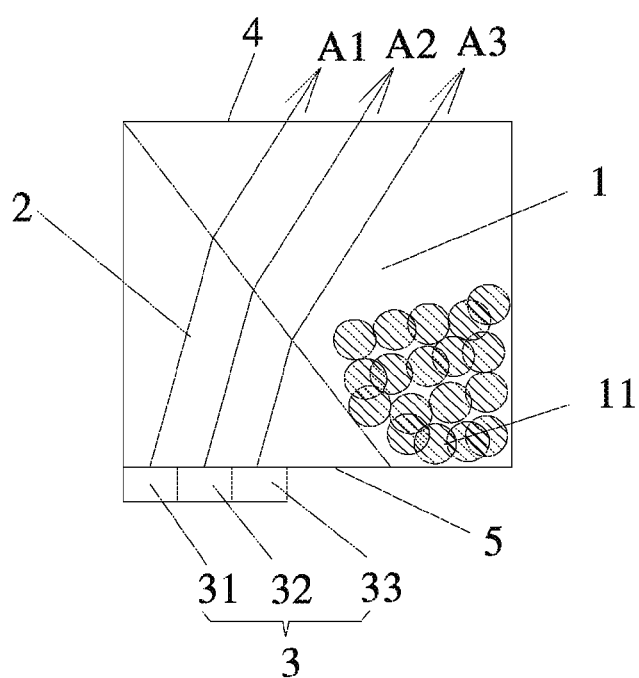
FIG. 2 shows a schematic side view of a pixel unit of the display panel in accordance with the first embodiment of the present invention in the active lighting mode.

The display panel according to the first embodiment of the present invention comprises a plurality of pixel units. FIG. 1 and FIG. 2 show schematic side views of one of the pixel units of the display panel in accordance with the present embodiment of the present invention in the E-ink mode and in the active lighting mode respectively. As shown in FIG. 1 and FIG. 2, each of the pixel units has a first surface 4 and a second surface 5 opposite to the first surface 4, wherein the first surface 4 is closer to the display surface of the display panel, and so that it is closer to the eyes of the user. Each of the pixel units comprises an electrophoretic gel part 1, a light guiding part 2 and a light-emitting device 3.

The electrophoretic gel part 1 and the light guiding part 2 match in shape and abut with each other. And the electrophoretic gel part 1 has a shape tapered in a direction from the first surface 4 to the second surface 5, i.e. the downward direction in FIG. 1 and FIG. 2. The light guiding part 2 has a shape tapered in a direction from the second surface 5 to the first surface 4 i.e. the upward direction in FIG. 1 and FIG. 2. That is, the electrophoretic gel part 1 and the light guiding part 2 are tapered in opposite directions. As shown, the top surface of the electrophoretic gel part 1 forms the first surface 4 of the pixel unit and electrophoretic particles 11 are provided in the electrophoretic gel part 1. The bottom surface of the light guiding part 2 forms at least a portion of the second surface 5. In the present embodiment, the bottom surface of the light guiding part 2 forms about ⅔ of the area of the second surface 5. Naturally, in other embodiments in accordance with the present invention, the area ratio of the bottom surface of the light guiding part 2 to the second surface 5 of the pixel unit can be a ratio different from the ratio of the present embodiment. A light-emitting device 3 is provided on the bottom surface of the light guiding part 2 and is operable to emit light toward the first surface 4. The light emitted by the light-emitting device 3 passes through the light guiding part 2 and the electrophoretic gel part 1 and projects from the top surface of the electrophoretic gel part 1, i.e. the first surface 4 of the pixel unit. It could be understand by those skilled in the art it is needed that the shape of the light guiding part 2 and the position of the light-emitting device 3 are provided in such a way that the light emitted by the light-emitting device 3 is able to reach and cover the entire first surface 4 so that the light from the light-emitting device 3 can be received by the eyes of the user, and consequently the patterns to be displayed can be seen.

It will be understood from the above description of the pixel unit of the display panel that since the electrophoretic gel part 1 has a shape tapered in a direction from the first surface to the second surface, the electrophoretic particles 11 will gather at the reduced bottom of the electrophoretic gel part 1 when the electrophoretic particles 11 are controlled to be located near the second surface 5 of the pixel unit, and consequently the emitting path of the light emitted by the light-emitting device 3 will not be blocked. The user can see the color of the electrophoretic particles 11 when the electrophoretic particles 11 are located at the larger top of the electrophoretic gel part 1. Thus, it is possible to control the display panel to run in the E-ink mode or in the active lighting mode through controlling of the positions of the electrophoretic particles 11 and the states of the light-emitting device 3.

Specifically, when it is needed to save power or to use the display panel in the sun or in the high light environment, the light-emitting devices 3 of the pixel units of the display panel can be turned off and the motions of the electrophoretic particles 11 in the electrophoretic gel parts 1 can be controlled such that the electrophoretic particles 11 are located at the positions corresponding to the patterns to be displayed. In the present embodiment, the electrophoretic particles 11 are black electrophoretic particles. When it is needed to display a black color at a certain position on the display panel, the motions of the electrophoretic particles 11 in the electrophoretic gel parts 1 of the pixel units at this position are controlled so that the electrophoretic particles 11 are located at the first surface 4 of the pixel units, i.e. the top surface of the electrophoretic gel part 1, as shown in FIG. 1. Thus, the user can see the black color at this position. On the contrary, when it is needed to display a white color at a certain position on the display panel, the motions of the electrophoretic particles 11 in the electrophoretic gel parts 1 of the pixel units at this position are controlled so that the electrophoretic particles 11 are located near the second surface 5 of the pixel unit, i.e. the bottom surface of the electrophoretic gel part 1. Thus, the user won't see the black color at this position. When the patterns are displayed by electrophoretic particles, the power consumption is lower and the contents of the displayed patterns can be viewed conveniently in the high light environment.

On the other hand, when it is needed to display colors on the display panel or to use the display panel in the dark, the motions of the electrophoretic particles 11 in the electrophoretic gel parts 1 of all the pixel units can be controlled such that all of the electrophoretic particles 11 are located at positions near the second surface 5 of the pixel units, i.e. the bottom of the electrophoretic gel parts 1, meanwhile, the light-emitting device 3 is controlled to emit light corresponding to the patterns to be displayed, as shown in FIG. 2. Since the electrophoretic gel part 1 is tapered along the direction from the first surface 4 to the second surface 5, the electrophoretic particles 11 will gather at the reduced bottom of the electrophoretic gel part 1 and occupy a small area of the second surface 5 of the pixel unit when the electrophoretic particles 11 are located at positions close to the second surface 5 of the pixel unit. Thus, the path of the light emitted from the light-emitting device 3 passing through the light guiding part 2, the electrophoretic gel part 1 and projecting from the first surface 4 will not be blocked by the electrophoretic particles 11. So that it is possible to display patterns on the display panel by means of the light emitted by the light-emitting devices 3 of all the pixel units. The light emitted from the light-emitting device 3 is illustrated with arrows A1, A2 and A3 in FIG. 2. When the patterns are displayed by the light emitted from the light-emitting device 3, a vivid display effect can be obtained and the display panel can be used even in the dark.

In conclusion, the structure of the pixel units in the display panel enables the display panel to run in two modes: the display panel can run in the E-ink mode with patterns displayed by electrophoretic particles 11 when it is needed to save power or to use the display panel in the sun or in the high light environment; the display panel can run in the active lighting mode with patterns displayed by the light-emitting devices 3 in the pixel units when it is needed to display vivid colors or to use the display panel in the darkness. Therefore, advantages of both the display panel using e-ink technology and active lighting technology are combined in the display panel of the present invention which can be adapted to high light environment and low light environment flexibly and the power consumption thereof can be lowered.

Preferably, in the present embodiment, the electrophoretic particles 11 are black electrophoretic particles. However, in other embodiments, the electrophoretic particles may be electrophoretic particles with other colors, e.g., white electrophoretic particles. In the present embodiment, the electrophoretic particles 11 are electronegative, so that it is possible to control the positions of the electrophoretic particles by applying electric fields to the pixel units. The electrophoretic particles can be electropositive in other embodiments of the present invention.

The electrophoretic gel part 1 and the light guiding part 2 may have any suitable shapes. Preferably, as seen from FIG. 1 and FIG. 2, in the present embodiment, a longitudinal cross-section of the electrophoretic gel part 1 perpendicular to a lateral direction comprises an upside-down right trapezoid portion. Correspondingly, a longitudinal cross-section of the light guiding part 2 perpendicular to the lateral direction comprises a right triangle portion. The hypotenuse of the right triangle portion is collinear with a longer lateral side of the right trapezoid portion, so as to form a border-line between the longitudinal cross-section of the electrophoretic gel part 1 perpendicular to the lateral direction and the longitudinal cross-section of the light, guiding part 2 perpendicular to the lateral direction. That is, the interface between the electrophoretic gel part 1 and the light guiding part 2 is an inclined plane. The above mentioned structures of the electrophoretic gel part 1 and the light guiding part 2 are so simple that the pixel units are easy to manufacture and the manufacturing cost of the display panel is reduced. It should be noted that in the present invention, the "lateral direction" refers to a direction perpendicular to the paper in the figures. The above mentioned shapes of the electrophoretic gel part 1 and the light guiding part 2 facilitates manufacturing of electrophoretic gel parts 1 of the plurality of pixel units integrally and manufacturing of light guiding parts 2 of the plurality of pixel units integrally along the lateral direction.

Furthermore, preferably, the light-emitting device 3 may comprise one or more organic light emitting diodes. As shown in FIG. 1 and FIG. 2, in the present embodiment, the light-emitting device 3 comprises a red organic light emitting diode 31, a green organic light emitting diodes 32 and a blue organic light emitting diode 33.

The display panel in accordance with the present embodiment further comprises a controller (not shown) which is connected to the pixel units so as to control the pixel units to switch between the E-ink mode and the active lighting mode.

When the pixel units are in E-ink mode, the controller turns off the light-emitting device 3 and applies electric filed to the pixel units so that the black electronegative electrophoretic particles 11 are located at positions corresponding to the patterns to be displayed. Specifically, when it is needed to display a black color at a certain position on the display panel, the controller controls the motions of the electronegative electrophoretic particles 11 in the electrophoretic gel parts 1 of the pixel units at this position, so that the electronegative electrophoretic particles 11 are located at the first surface 4, i.e. the top surface of the electrophoretic gel part 1, as shown in FIG. 1. Thus, the user can see the black color at this position. On the contrary, when it is needed to display a white color at a certain position on the display panel, the controller controls the motions of the electronegative electrophoretic particles 11 in the electrophoretic gel parts 1 of the pixel units at this position, so that the electronegative electrophoretic particles 11 are located near the second surface 5, i.e. the bottom surface of the electrophoretic gel part 1. Thus, the user won't see the black color at this position.

As shown in FIG. 2, when the pixel units are in the active lighting mode, the controller applies electric fields to all of the pixel units so that all of the black electronegative electrophoretic particles 11 are located near the second surface 5 of the pixel unit, i.e. the bottom surface of the electrophoretic gel part 1, and controls the light-emitting device 3 to emit light corresponding to the patterns to be displayed. As mentioned above, the path of the light emitted from the light-emitting device 3 and projecting from the first surface 4 will not be blocked by the electrophoretic particles 11, so that it is possible to display patterns on the display panel by means of the light emitted by the light-emitting devices 3 of all the pixel units.

Preferably, in the present embodiment, the display panel may further comprise a switch operating member (not shown), e.g. a press-button, which is coupled to the controller and sends a signal for selecting the E-ink mode or the active lighting mode to the controller according to the operation by the user to the switch operating member. The controller controls the pixel units to switch between the E-ink mode and the active lighting mode according to the signal. For example, the contact terminals of the press-button are coupled to the input ends of the controller. When the press-button is pressed down by the user, the contacts of the press-button are joined and the signal for selecting the E-ink mode is sent to the controller. The controller controls the pixel units to switch into the E-ink mode according to the signal. When the press-button is reset by the user, the contacts of the press-button are disjoined and a signal for selecting the active lighting mode is sent to the controller. The controller controls the pixel units to switch into the active lighting mode according to the signal.

Or preferably, in other embodiments, the display panel may further comprise an ambient light sensor which is coupled to the controller and sends a signal corresponding to an intensity of ambient light to the controller. The controller controls the pixel units to switch to the E-ink mode when the intensity of ambient light is higher than a predetermined value, so that the contents of the display panel can be viewed in the high light environment and the power consumption of the display panel can be lowered. The controller controls the pixel units to switch to the active lighting mode when the intensity of ambient light is lower than or equal to the predetermined value, so that the contents of the display panel can be viewed in the darkness.

In addition, it will be understand by those skilled in the art that the material chosen for the light guiding part 2 should have such a refractive index that light emitted by the light-emitting device 3 is able to reach and cover the entire first surface 4. Moreover, it will be understand by those skilled in the art that the material with high transmittance should be chosen as the material for the light guiding part 2. Preferably, the light guiding part 2 is made of Polymethyl Methacrylate (PMMA) material or Cycio Olefins Polymer material with high light transmittance.

As mentioned above, the electrophoretic gel part 1 and the light guiding part 2 can have any suitable shapes which match and abut with each other, as long as the electrophoretic gel part 1 and the light guiding part 2 are tapered in opposite directions and the light emitted by the light-emitting device 3 is able to reach and cover the entire first surface 4.

Figure 3:
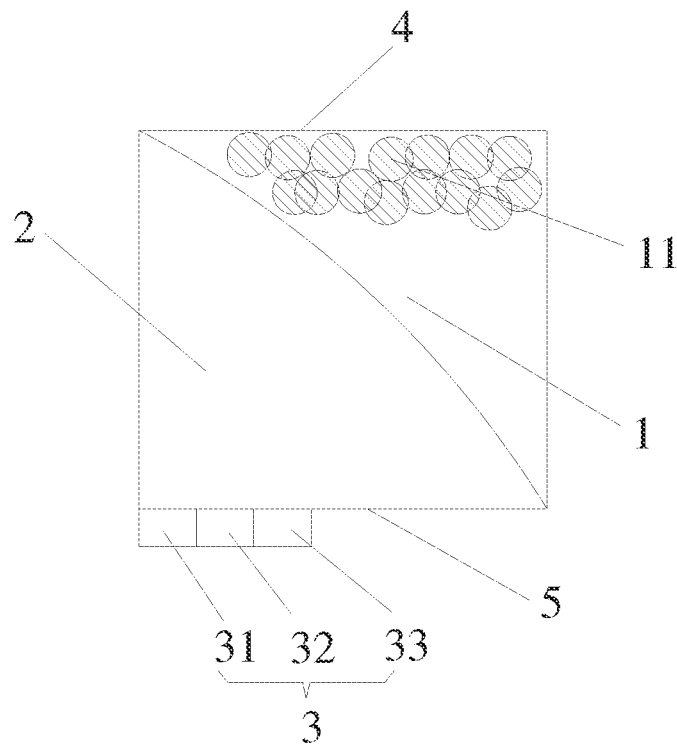
FIG. 3 shows a schematic side view of a pixel unit of the display panel in accordance with the second embodiment of the present invention.

As shown in FIG. 3, the features of the display panel according to the second embodiment of the present invention are mostly the same as the first embodiment, except that the border-line between the longitudinal cross-section of the electrophoretic gel part 1 perpendicular to the lateral direction and the longitudinal cross-section of the light guiding part 2 perpendicular to the lateral direction is an arc which protrudes toward the electrophoretic gel part 1 in the second embodiment. That is, the interface between the electrophoretic gel part 1 and the light guiding part 2 is an arc-shaped plane. Naturally, the border-line between the longitudinal cross-section of the electrophoretic gel part 1 perpendicular to the lateral direction and the longitudinal cross-section of the light guiding part 2 perpendicular to the lateral direction can protrude toward the light guiding part 2 in other embodiments in accordance with the present invention.

Figure 4:
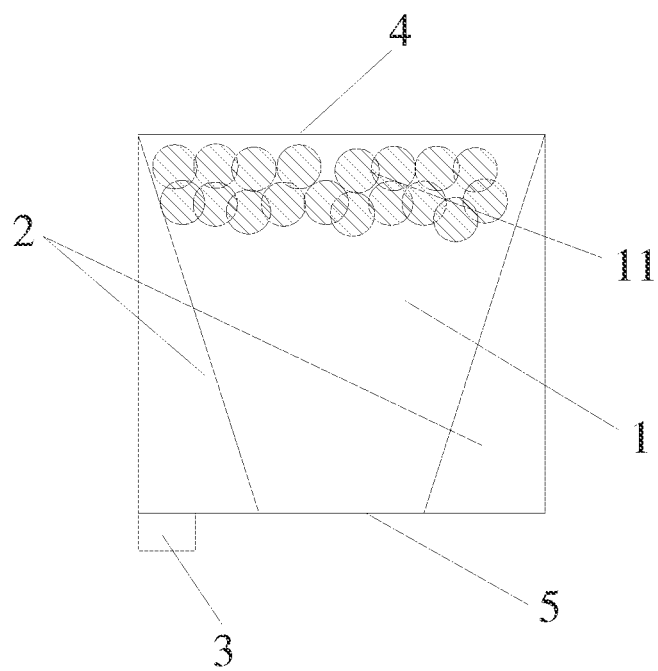
FIG. 4 shows a schematic side view of a pixel unit of the display panel in accordance with the third embodiment of the present invention.

As shown in FIG. 4, the features of the display panel according to the third embodiment of the present invention are mostly the same as the first embodiment except that the longitudinal cross-section of the electrophoretic gel part 1 perpendicular to the lateral direction comprises an upside-down trapezoid portion, and the longitudinal cross-section of the light guiding part 2 perpendicular to the lateral direction comprises two right triangle portions located at two sides of the upside-down trapezoid portion respectively. Wherein two lateral sides of the upside-down trapezoid portion are collinear with the hypotenuses of the two right triangle portions, so as to form a border-line between the longitudinal cross-section of the electrophoretic gel part 1 perpendicular to the lateral direction and the longitudinal cross-section of the light guiding part 2 perpendicular to the lateral direction. That is, the interfaces between the electrophoretic gel part 1 and the two parts of the light guiding part 2 are both inclined planes.

Figure 5:
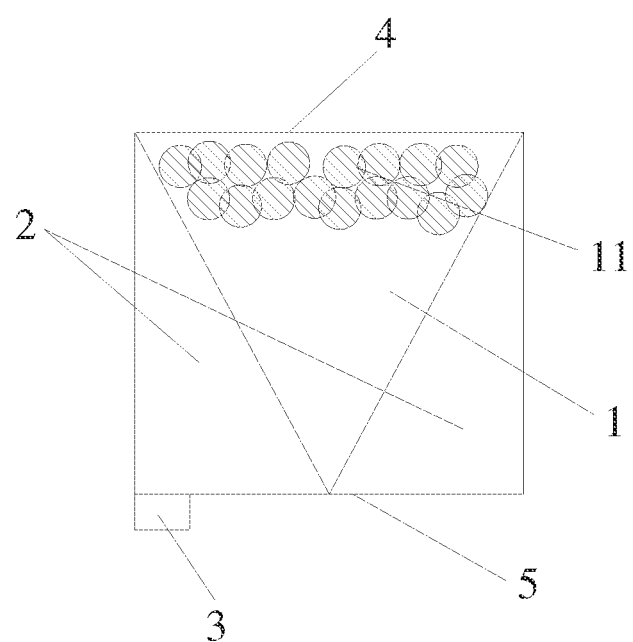
FIG. 5 shows a schematic side view of a pixel unit of the display panel in accordance with the fourth embodiment of the present invention.

As shown in FIG. 5, the features of the display panel according to the fourth embodiment of the present invention are mostly the same as the first embodiment except that the longitudinal cross-section of the electrophoretic gel part 1 perpendicular to the lateral direction comprises an upside-down triangle portion, and the longitudinal cross-section of the light guiding part 2 perpendicular to the lateral direction comprises two right triangle portions located at two sides of the upside-down triangle portion respectively. Wherein two lateral sides of the upside-down triangle portion are collinear with the hypotenuses of the two right triangle portions, so as to form a border-line between the longitudinal cross-section of the electrophoretic gel part 1 perpendicular to the lateral direction and the longitudinal cross-section of the light guiding part 2 perpendicular to the lateral direction. That is, the interfaces between the electrophoretic gel part 1 and the two parts of the light guiding part 2 are both inclined planes.

In accordance with another aspect of the present invention, a flat panel electronic apparatus is further provided which may comprise any one of the display panels mentioned above. The properties and features of the display panel of the flat panel electronic apparatus have been described previously and will not be described in detail here for the sake of simplicity. The advantages of both the display panels using the E-ink technology and the display panels using the active lighting technology are combined in the display panel of the flat panel electronic apparatus which can be adapted to high light environment and low light environment flexibly and the power consumption thereof can be lowered.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A display panel, comprising a plurality of pixel units, with each of the pixel units having a first surface and a second surface opposite to the first surface, wherein each of the pixel units comprises:
   an electrophoretic gel part with a shape tapered in a direction from the first surface to the second surface, wherein a top surface of the electrophoretic gel part forms the first surface, and electrophoretic particles are provided in the electrophoretic gel part;
   a light guiding part with a shape tapered in a direction from the second surface to the first surface, wherein the light guiding part and the electrophoretic gel part match in shape and abut with each other, and a bottom surface of the light guiding part forms at least a portion of the second surface; and
   a light-emitting device provided on the bottom surface of the light guiding part and operable to emit light toward the first surface,
   wherein the shape of the light guiding part and the position of the light-emitting device are provided in such a way that light emitted by the light-emitting device is able to reach and cover the entire first surface.

2. The display panel according to claim 1, characterized in that
   a longitudinal cross-section of the electrophoretic gel part perpendicular to a lateral direction comprises an upside-down right trapezoid portion; and
   a longitudinal cross-section of the light guiding part perpendicular to the lateral direction comprises a right triangle portion, wherein a hypotenuse of the right triangle portion is collinear with a longer lateral side of the right trapezoid portion, so as to form a border-line between the longitudinal cross-section of the electrophoretic gel part perpendicular to the lateral direction and the longitudinal cross-section of the light guiding part perpendicular to the lateral direction.

3. The display panel according to claim 1, characterized in that a border-line between a longitudinal cross-section of the electrophoretic gel part perpendicular to a lateral direction and a longitudinal cross-section of the light guiding part perpendicular to the lateral direction is an arc which protrudes toward the electrophoretic gel part or the light guiding part.

4. The display panel according to claim 1, characterized in that
a longitudinal cross-section of the electrophoretic gel part perpendicular to a lateral direction comprises an upside-down trapezoid portion or an upside-down triangle portion; and
a longitudinal cross-section of the light guiding part perpendicular to the lateral direction comprises two right triangle portions located at two sides of the upside-down trapezoid portion or the upside-down triangle portion respectively, wherein two lateral sides of the upside-down trapezoid portion or two lateral sides of the upside-down triangle portion are collinear with the hypotenuses of the two right trapezoid portions respectively, so as to form a border-line between the longitudinal cross-section of the electrophoretic gel part perpendicular to the lateral direction and the longitudinal cross-section of the light guiding part perpendicular to the lateral direction.

5. The display panel according to claim 1, characterized in that the light-emitting device comprises one or more organic light emitting diodes.

6. The display panel according to claim 1, characterized in that the electrophoretic particles are black and electronegative.

7. The display panel according to claim 6, characterized in that the display panel further comprises a controller which controls the pixel units to switch between an E-ink mode and an active lighting mode, wherein
when the pixel units are in the E-ink mode, the controller turns off the light-emitting devices and applies electric fields to the pixel units so that the electrophoretic particles are located at positions corresponding to a pattern to be displayed;
when the pixel units are in the active lighting mode, the controller applies electric fields to the pixel units so that the electrophoretic particles are located at the bottom surfaces of the electrophoretic gel parts, and controls the light-emitting devices to emit light corresponding to a pattern to be displayed.

8. The display panel according to claim 7, characterized in that the display panel further comprises a switch operating member, wherein
the switch operating member is coupled to the controller and sends a signal for selecting the E-ink mode or the active lighting mode to the controller; and
the controller controls the pixel units to switch between the E-ink mode and the active lighting mode according to the signal.

9. The display panel according to claim 7, characterized in that the display panel further comprises an ambient light sensor, wherein
the ambient light sensor is coupled to the controller and sends a signal corresponding to an intensity of ambient light to the controller;
the controller controls the pixel units to switch to the E-ink mode when the intensity of ambient light is higher than a predetermined value, and the controller controls the pixel units to switch to the active lighting mode when the intensity of ambient light is lower than or equal to the predetermined value.

10. The display panel according to claim 1, characterized in that the material of the light guiding part has such a refractive index that light emitted by the light-emitting device is able to reach and cover the entire first surface.

11. The display panel according to claim 10, characterized in that the light guiding part is made of Polymethyl Methacrylate material or Cycio Olefins Polymer material.

12. A flat panel electronic apparatus, having a display panel, wherein the display panel comprises a plurality of pixel units, with each of the pixel units having a first surface and a second surface opposite to the first surface, wherein each of the pixel units comprises:
an electrophoretic gel part with a shape tapered in a direction from the first surface to the second surface, wherein a top surface of the electrophoretic gel part forms the first surface, and electrophoretic particles are provided in the electrophoretic gel part;
a light guiding part with a shape tapered in a direction from the second surface to the first surface, wherein the light guide part and the electrophoretic glue part match in shape and abut with each other, and a bottom surface of the light guiding part forms at least a portion of the second surface; and
a light-emitting device provided on the bottom surface of the light guiding part and operable to emit light toward the first surface,
wherein the shape of the light guiding part and the position of the light-emitting device are provided in such a way that light emitted by the light-emitting device is able to reach and cover the entire first surface.

13. The flat panel electronic apparatus according to claim 12, characterized in that
a longitudinal cross-section of the electrophoretic gel part perpendicular to a lateral direction comprises an upside-down right trapezoid portion; and
a longitudinal cross-section of the light guiding part perpendicular to the lateral direction comprises a right triangle portion, wherein a hypotenuse of the right triangle portion is collinear with a longer lateral side of the right trapezoid portion, so as to form a border-line between the longitudinal cross-section of the electrophoretic gel part perpendicular to the lateral direction and the longitudinal cross-section of the light guiding part perpendicular to the lateral direction.

14. The flat panel electronic apparatus according to claim 12, characterized in that
a longitudinal cross-section of the electrophoretic gel part perpendicular to a lateral direction comprises an upside-down trapezoid portion or an upside-down triangle portion; and
a longitudinal cross-section of the light guiding part perpendicular to a lateral direction comprises two right triangle portions located at two sides of the upside-down trapezoid portion or the upside-down triangle portion respectively, wherein two lateral sides of the upside-down trapezoid portion or two lateral sides of the upside-down triangle portion are collinear with the hypotenuses of the two right trapezoid portions respectively, so as to form a border-line between the longitudinal cross-section of the electrophoretic gel part perpendicular to the lateral direction and the longitudinal cross-section of the light guiding part perpendicular to the lateral direction.

15. The flat panel electronic apparatus according to claim 12, characterized in that the electrophoretic particles are black and electronegative.

16. The flat panel electronic apparatus according to claim 15, characterized in that the display panel further comprises a controller which controls the pixel units to switch between an E-ink mode and an active lighting mode, wherein
when the pixel units are in the E-ink mode, the controller turns off the light-emitting devices and applies electric fields to the pixel units so that the electrophoretic particles are located at positions corresponding to a pattern to be displayed;
when the pixel units are in the active lighting mode, the controller applies electric fields to the pixel units so that the electrophoretic particles are located at the bottom surfaces of the electrophoretic gel parts, and controls the light-emitting devices to emit the light corresponding to a pattern to be displayed.

17. The flat panel electronic apparatus according to claim 16, characterized in that the display panel further comprises a switch operating member, wherein
the switch operating member is coupled to the controller and sends a signal for selecting the E-ink mode or the active lighting mode to the controller; and
the controller controls the pixel units to switch between the E-ink mode and the active lighting mode according to the signals.

18. The flat panel electronic apparatus according to claim 16 characterized in that the display panel further comprises an ambient light sensor, wherein
the ambient light sensor is coupled to the controller and sends a signal corresponding to an intensity of ambient light to the controller;
the controller controls the pixel units to switch to the E-ink node when the intensity of ambient light is higher than a predetermined value, and the controller controls the pixel units to switch to the active lighting mode when the intensity of ambient light is lower than or equal to the predetermined value.

19. The flat panel electronic apparatus according to claim 12, characterized in that the material of the light guiding part has such a refractive index that light emitted by the light-emitting device is able to reach and cover the entire first surface.

20. The flat panel electronic apparatus according to claim 19, characterized in that the light guiding part is made of Polymethyl Methacrylate material or Cycio Olefins Polymer material.

* * * * *